US010397401B1

(12) United States Patent
Brkovic et al.

(10) Patent No.: US 10,397,401 B1
(45) Date of Patent: Aug. 27, 2019

(54) PSAP IN A BOX

(71) Applicant: West Corporation, Omaha, NE (US)

(72) Inventors: Michel Brkovic, Ste-Eustache (CA); Yvon Desnoyers, Saint-Jean-sur-Richelieu (CA); Mike DeWeese, Brighton, CO (US); Papa Diop, Laval (CA); Paul Guest, Montreal (CA); Mario Manzanillo, Dollard-des-Ormeaux (CA)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 15/926,677

(22) Filed: Mar. 20, 2018

(51) Int. Cl.
*H04M 3/42* (2006.01)
*H04M 3/51* (2006.01)
*H04W 4/90* (2018.01)
*H04W 76/50* (2018.01)

(52) U.S. Cl.
CPC ..... *H04M 3/5116* (2013.01); *H04M 3/42042* (2013.01); *H04W 4/90* (2018.02); *H04M 2242/04* (2013.01); *H04W 76/50* (2018.02)

(58) Field of Classification Search
USPC .................................................... 379/37–52
See application file for complete search history.

(56) References Cited

U.S. PATENT DOCUMENTS

| 2010/0317317 | A1* | 12/2010 | Maier | H04W 64/00 455/404.2 |
| 2015/0229766 | A1* | 8/2015 | Herron, Jr. | H04M 7/006 379/45 |
| 2016/0337831 | A1* | 11/2016 | Piett | H04W 4/90 |

* cited by examiner

Primary Examiner — Maria El-Zoobi
(74) Attorney, Agent, or Firm — Raffi Gostanian

(57) ABSTRACT

An example computing system may include one or more of a chassis including an enclosure and a communication interface, and a plurality of server modules that form a PSAP, housed by the enclosure of the chassis, and communicating via the communication interface, wherein the plurality of server modules include a communication server module that interconnects the PSAP to a radio signal, a recorder, a telephone line, and an operator call talking system, a call talking server module that executes a call-taking application for outputting audio of the PSAP to the operator call talking system, and a computer aided dispatch (CAD) server module that outputs a computer aided dispatch for emergency vehicles and/or emergency services via a display device of the operator call talking system.

18 Claims, 5 Drawing Sheets

FIG. 3A
(Front View)

FIG. 3B
(Rear View)

FIG. 5

PSAP IN A BOX

TECHNICAL FIELD

This application generally relates to a public safety answering point (PSAP), and more particularly, to a system and method for implementing a PSAP within a single enclosure (or as few as possible when redundancy is mandated) thereby reducing an amount of cabling, increasing compatibility among the different components, and improving reliability of the PSAP.

BACKGROUND

In a public-safety answering point (PSAP), the number of systems and devices always seems to be increasing. The increase in components can cause congestion making it hard to access devices, cables, and connections for maintenance or service. The original installation may be neatly laid out, installed, and appear fine, but over time systems and components may be added and/or replaced creating the congestion within a workspace of an operator. Congestion also reduces the amount of space available for devices and reduces the capacity for cables. These new or replacement devices may not fit as well as their predecessors, nor are they often installed with the same degree of cable management.

Located at the workstation of a PSAP call talking station is a computer system that runs the computer aided dispatch (CAD) software. The CAD software usually requires multiple monitors to provide data entry space, suggested response information, responder unit status, etc. In addition, these systems often provide global information system (GIS) data and/or mapping of the location in question, with layers of mapped data to help with the dispatch, or to provide the first responder with data to support them in their mission. The data can be anything such as fire-hydrant locations, power-transformer locations, boundaries between ambulance companies or other response units, and the like.

In order to run all of these different software systems there is typically a number of different computer and server equipment that individually connect to radio, telephony, Internet, and which host the call-talking application, CAD software, GIS software, mapping software, and the like. In order to connect all these different devices together requires a number of ethernet cables, switches, power cords, keyboards, mouse cords, and the like. Furthermore, the number of cables necessary for network connectivity has increased since PSAP systems began providing an evidentiary record of all activity for the logging recorder to store for subsequent retrieval and review. Systems connect to other systems, and data is exchanged as the next generation 9-1-1 (NG9-1-1) compliant system is installed. Accordingly, what is needed is a more efficient and less space consuming technology for implementing a PSAP.

SUMMARY

In one example embodiment, provided is a modular server system that includes one or more of a chassis including an enclosure and a communication interface, and a plurality of server modules that perform a PSAP, the plurality of server modules being housed by the enclosure of the chassis and communicating via the communication interface, wherein the plurality of server modules may include a communication server module that interconnects the PSAP to a radio signal, a recorder, a telephone line, and an operator call talking system, a call talking server module that executes a call-taking application for outputting audio of the PSAP to the operator call talking system, and a CAD server module that outputs a computer aided dispatch for emergency vehicles and/or emergency services via a display device of the operator call talking system.

In another example embodiment, provided is a PSAP system that includes one or more of an operator call talking system including a computing system and one or more of a monitor, a phone, and an input device, and a modular server system connected to the call talking system and including a chassis and a plurality of server modules that form a PSAP and that are housed by and interconnected within the chassis, wherein the plurality of server modules may include a communication server module that interconnects the PSAP to a radio, a recorder, a telephone line, and the operator call talking system, a call talking server module that executes a call-taking application for outputting audio of the PSAP to an audio device of the operator call talking system, and a computer aided dispatch (CAD) server module that outputs a computer aided dispatch for emergency vehicles and/or emergency services via a display device of the operator call talking system.

In another example embodiment, provided is a computer-implemented method that includes one or more receiving, via a first server module of a PSAP modular server system, a telephone call via a telephone network, outputting, via a second server module of the PSAP modular server system, the telephone call to a telephone system of an operator call talking station, outputting, via a third server module of the PSAP modular server system, a display of a CAD associated with the telephone call on a monitor of the operator call talking station, and outputting, via a fourth server module of the PSAP modular server system, a display of a GIS based map associated with the telephone call on the monitor of the operator call talking station.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

DETAILED DESCRIPTION

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application relates to a public-safety answering point (PSAP) also referred to as a public safety access point, and in particular, to a modular server system that houses the PSAP functionality within a single enclosure. By having a single enclosure that can accept the parts of a PSAP, the system greatly minimizes the space requirement and cabling requirement of a rack-mounted PSAP, eliminates compatibility issues, greatly reduces the costs and improves the reliability of the installation. In some embodiments, the enclosure can serve as a call-taking position and as backroom equipment by including servers and switches. It should also be appreciated that the PSAP (or the customer) may require redundancy. When such redundancy is mandated, a PSAP may be included in a single enclosure while a back-up (or redundant) PSAP and all the functionality may be included in a second enclosure thereby satisfying such redundancy requirements.

In related systems, a PSAP typically requires a desktop computer for each call-talking position to run a call-taking application software which the operator uses to answer emergency and other calls. In addition, the desktop computer often includes a computer animated dispatch (CAD) tool, a geographical mapping tool, as well as other software tools. Additionally, the PSAP requires multiple host servers in a back-end server room that run a voice over IP (VoIP) application, telephony application, as well as MAP, GIS, CAD, etc. application servers. Most, if not all of the equipment must be duplicated for redundancy. Furthermore, ethernet switches are needed to connect all the equipment together to the PSAP network. The equipment and cabling creates cost, complexity and consumes space. To overcome these drawbacks, the example embodiments provide a single enclosure that can accept any or all of these parts within a single box such as a server module system such as a blade server. The single enclosure greatly reduces the space requirement, eliminates compatibility issues (which can be caused by multiple vendors), greatly reduces the costs and improves the reliability of the installation. In some embodiments, the enclosure can serve as a call-taking position and as backroom equipment by including servers and switches within the enclosure.

Figure 1:
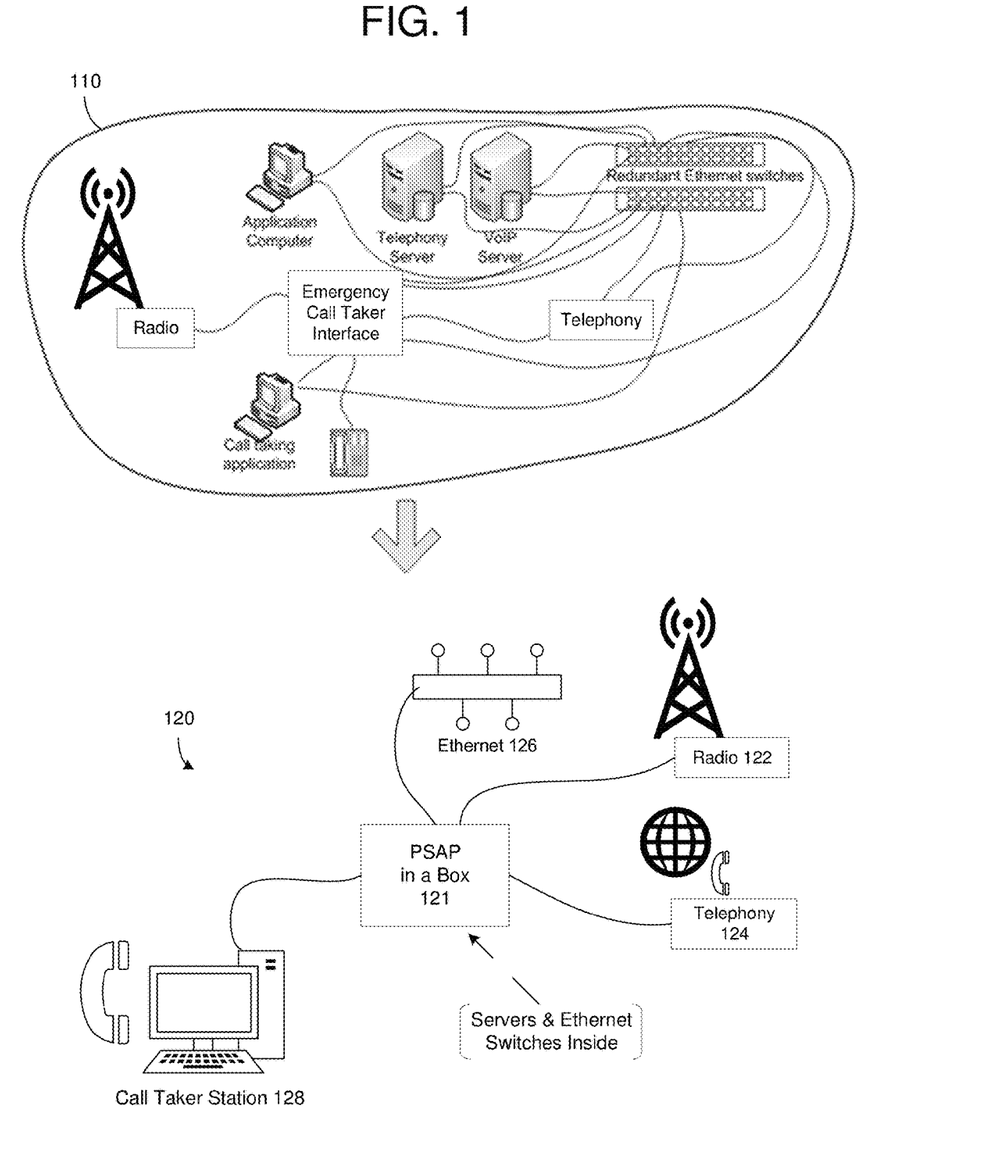
FIG. 1 is a diagram illustrating a different between a related PSAP network with respect to a PSAP in a box in accordance with an example embodiment.

FIG. 1 illustrates a comparison between a related PSAP network system 110 and a PSAP network system 120 in accordance with example embodiments. Referring to the related PSAP network system 110, a call taker interface connects with a radio communication line, a telephone line, a plurality of servers (e.g., application servers, telephony servers, VoIP servers, etc.), and the like. Some or all of these connections may be made through a bus or grouping of switches and require cabling to be provided between the devices and the ethernet switch, and between the ethernet switch and the call taker station. In some cases, the various servers may be implemented via a back-end server room and may be rack-mounted within a cabinet or other apparatus capable of housing multiple standalone servers. However, each server mounted in the rack is essentially a stand alone computer on which applications are run. In a rack-mounted server, all components like hard drives, network cards, cooling, etc., are included in each server, and each server has its own separate cabling needs.

Meanwhile, the PSAP network system 120 in accordance with an example embodiment implements the components such as servers, cabling, interconnections, and the like within a single box 121. For example, the box 121 may be a modular server system such as a blade server, or the like. In this example, the box 121 has a connection with a radio line 122, a telephone line 124, and an ethernet input/output 126. However, the remaining components of the PSAP network shown in 110 may be implemented within the PSAP in a box 121. Accordingly, only one or a few cables are needed for connecting a call talking station 128 to the PSAP network 120. Furthermore, in some embodiments, the call talking station may further be implemented within the box 121.

In the PSAP network system 120, the application servers for CAD, GIS, mapping, etc., the cabling, the storage, the networking, the cooling, and the like, as well as the interconnections between the different services may be incorporated within the box 121. By incorporating the PSAP within the box 121, the PSAP network system 120 greatly reduces the complexity involved in setting up, maintaining, and/or repairing the components of the PSAP because all of the components are included in a single enclosure (i.e., box 121). Furthermore, the different applications may be pre-tested and incorporated together within the box 121 thereby preventing issues with compatibility.

Figure 2:
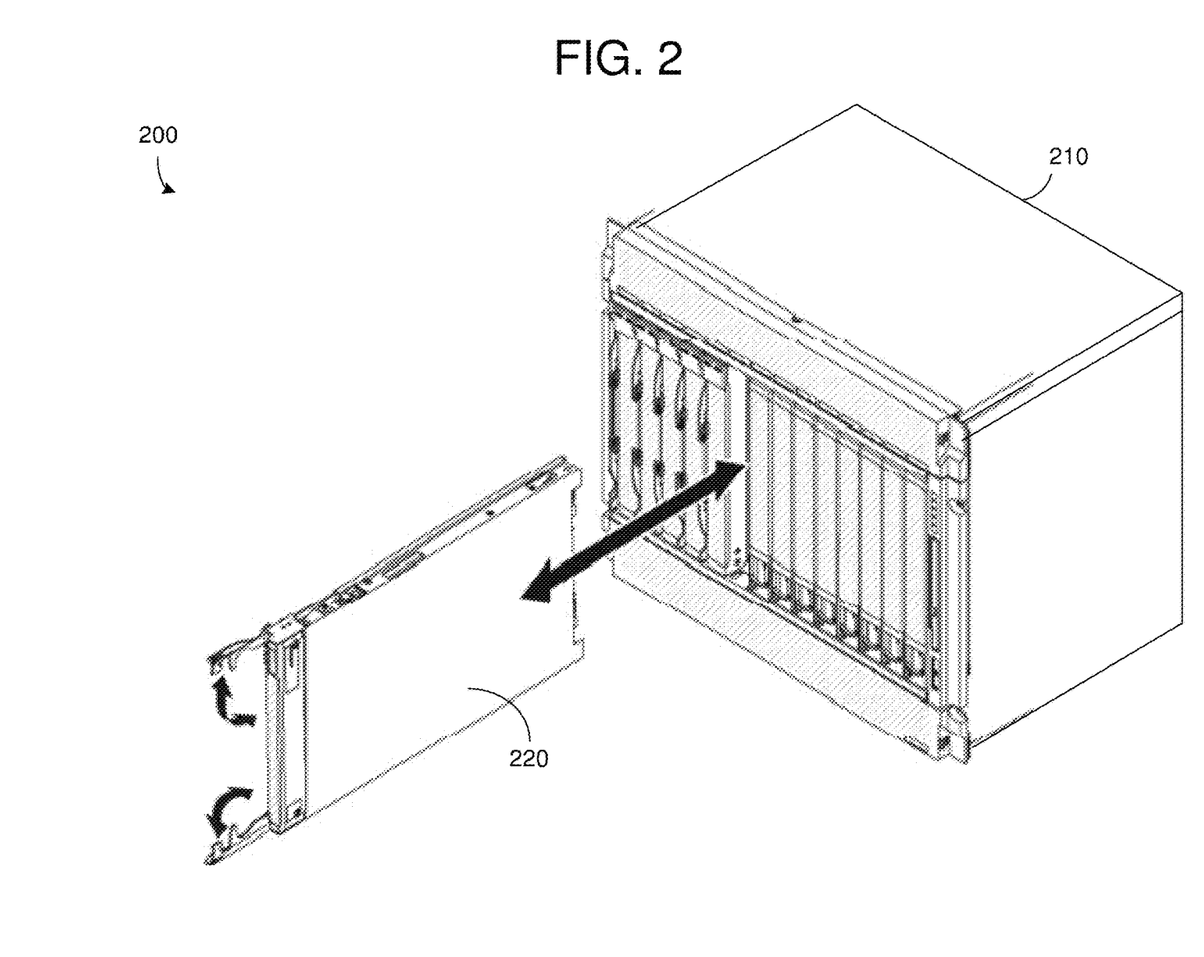
FIG. 2 is a diagram illustrating a modular server system in accordance with an example embodiment.

FIG. 2 illustrates an example of a modular server system 200 in accordance with an example embodiment which may correspond to the PSAP in a box 121 shown in FIG. 1. Referring to FIG. 2, the modular server system 200 includes a blade server system including a chassis 210 and a plurality of blades 220 which are housed by the chassis 210. The chassis 210 may be an enclosure that includes a bus or other interface to which the blades 220 may attach and communicate with the chassis 210 and the other blades 220, as well as communicate to other devices over a network. Here, the chassis 210 can provide a network connection to each of the blades 220. Each blade 220 may contain a full computer system, including processor(s), memory, network connections, and associated electronics. In addition, each blade 220 may some level of local disk storage with provisions to access external storage which may be implemented within the chassis 210 or may be remotely accessible (e.g., via a cloud).

Each blade may run its own instance of an operating system; consequently, administrators can designate individual blades for different applications or end users and can insert or remove (hot plug) them without affecting the operation of other blades 220. For example, the blade server 200 may be a diskless blade server 200 in which software applications float among the blades 220 during execution resulting in improved redundancy and the ability to replace a failed blade without affecting the system setup. Multiple blades plug into a midplane of the chassis 210 that provides shared, redundant infrastructure components such as power, cooling, networking, and cabling. Furthermore, administrators and designers can integrate components that customers would purchase separately such as remote management cards, Ethernet switches, and even KVM (keyboard, video, and mouse) switches into the chassis 210. Leveraging high-quality components over multiple server blades within a single enclosure also helps from a reliability standpoint, because the system has fewer components that could fail.

Referring again to the related PSAP network 110 system shown in FIG. 1, the process of deploying multiple servers can be a time-consuming and resource-intensive process. An administrator must install each server in a rack, cable the server to power and to a network, and provisions it with software. The cables, in particular, create one of the primary deployment headaches in high-density environments. For example, when cabling six (6) stand alone servers in a rack-mounted cabinet, each server requires a cable for network management, two cables for ethernet, two cables for power, and three cables for KVM, resulting in eight (8) cables for each server. As a result, in order to cable the 6 servers in a rack-mount requires a total of forty-eight cables.

Meanwhile, using blades 220 in the chassis 210 of the modular server system 200, an administrator installs and cables the chassis 210 only. That is, the individual server blades 220 need no cabling. In this case, adding (scaling) new compute resources is as easy as plugging in a new blade, just like adding a hard drive. The chassis 210 minimizes the amount of cabling because redundant power supplies are leveraged across multiple blades. In addition, built-in switches consolidate Ethernet data and management networks, and even KVM connections. Referring again to the example of six (6) server blades in a single chassis, the chassis needs one cable for network management, two cables for ethernet, two cables for power, and three cables for KVM resulting in a total of eight (8) cables for the six servers in comparison to the forty-eight (48) cables for the rack-mounted servers. It should also be appreciated, the blade server 200 is significantly smaller in size than a plurality of rack-mounted servers. For example, in some cases, the blade server 200 may designed and have a size such that it fits into a single rack of a standard-sized rack-mounted server.

Figure 3A:
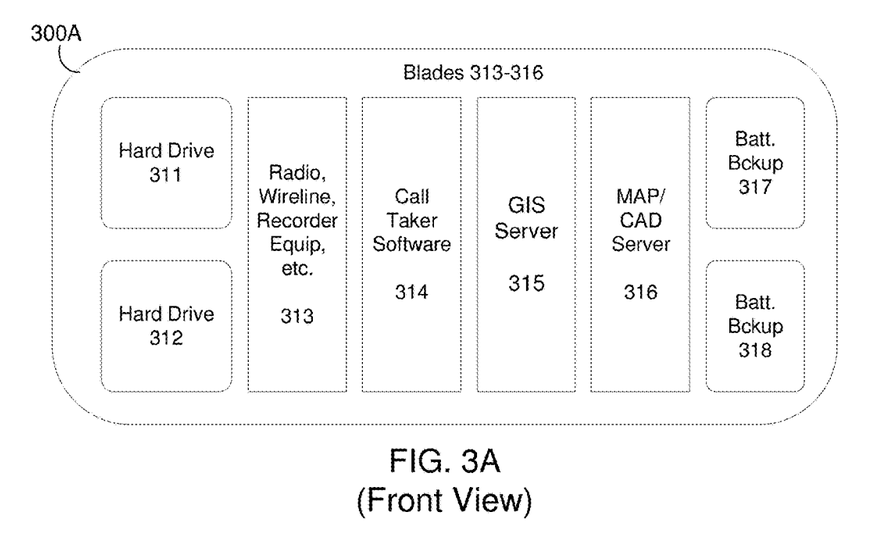
FIGS. 3A-3B are diagrams illustrating a front view and a rear view of a modular server system in accordance with an example embodiment.
Figure 3B:
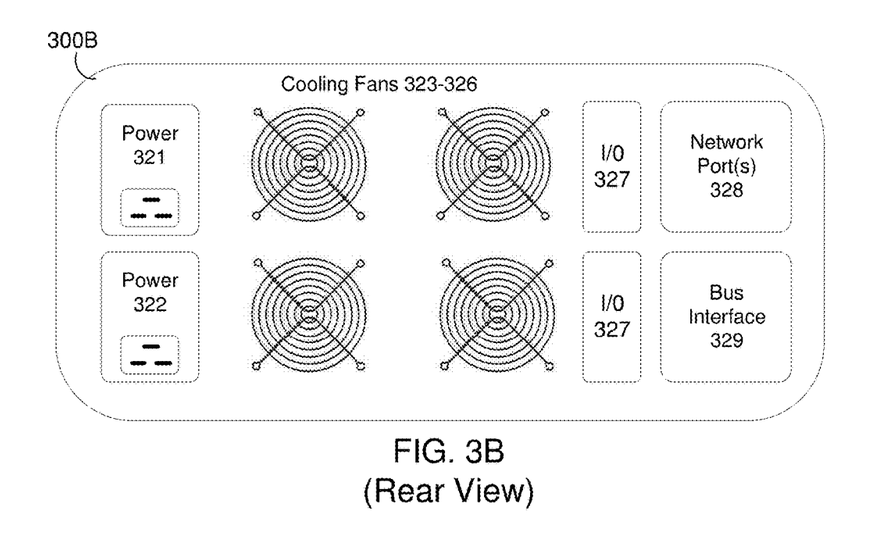

FIGS. 3A-3B illustrate a front view 300A and a rear view 300B of a modular server system in accordance with an example embodiment. Referring to FIG. 3A, a front face 300A of a chassis of a modular server system is shown. The chassis 300A forms an enclosure and may also include a connection interface such as a bus (not shown) as is known in the art for connecting with a plurality of blades and also other equipment such as storage, power, network connectivity, cooling, and the like. Here, a plurality of blades (i.e., four blades 313-316) are shown, however, it should be appreciated that the number of blades is not limited to four and may be one or more blades, for example, one blade two blades, four blades, six blades, 8 blades, 12 blades, and the like. According to various embodiments, the plurality of server modules may implement a PSAP, may be housed by the enclosure of the chassis, and may communicate via a standard communication interface of the modular server system. For example, the communication interface of the chassis may include a USB interface, and each of the server modules may include a corresponding USB interface which is used to connect to the communication interface of the chassis.

In the example of FIG. 3A, a first server module (blade 313) includes a communication server module that interconnects the PSAP to one or more of a radio signal, a recorder, a telephone line, an operator call talking system, and the like. The radio signal may include incoming radio communications from emergency personnel. The telephone line may include a call signal line for receiving emergency calls (e.g., 911, etc.) The recorder may record all calls that come in and be used for playback. The operator call talking system (not shown) may be a station or system including a telephone, one or more monitors, a computing system, an audio device, and the like. The operator call talking system may connect to the modular server system via a network cable such as a private network, a local network, the Internet, and/or the like.

Meanwhile, a second server module (blade 314) includes a call talking server module that executes a call-taking application for outputting audio of the PSAP to the operator call talking system. Furthermore, a third server module (blade 315) includes a GIS server module that generates and outputs geographic mapping to the operator call talking system. Furthermore, a fourth server module (blade 316) includes a CAD server module that outputs a computer aided dispatch for emergency vehicles and/or emergency services via a display device of the operator call talking system. It should also be appreciated that additional servers and applications of a PSAP not shown may be implemented within the modular server system. The combination of modules shown in FIG. 3A can be used to implement a PSAP such as a call center for answering calls for one or more of police, firefighting, and ambulance services.

Referring to FIG. 3B, a rear view 300B of the chassis is shown. In this example, the chassis includes the communication interface 329 (e.g., bus) and a shared network port or ports 328 that receive a network connection via such as through an external cable or wirelessly and that distributes the network connection to the plurality of server modules that comprises the PSAP via the communication interface. In this example, the plurality of server modules may share a single network port or two network ports, however, embodiments are not limited thereto. In addition, the chassis further includes input/output units 327 capable of connected to various I/O devices such as printers, scanners, faxes, KVM equipment, external storage, and the like. The chassis further includes options like cooling fans 323-326 and at least two power supplies 321 and 322 which are each shared by the plurality of server modules for redundancy. In some embodiments, the modular server system may include a diskless modular server system in which the plurality of server modules are configured to float between a plurality of blades. Although not shown in FIGS. 3A and 3B, the chassis may have a shape that is configured to be held within a single rack of a rack-mounted server cabinet. To facilitate carrying of the modular server system including the PSAP in a box, the modular server system may also include one or more handles. As a result, the PSAP in a box may be easily configured and/or moved between different locations for convenience.

Figure 4:
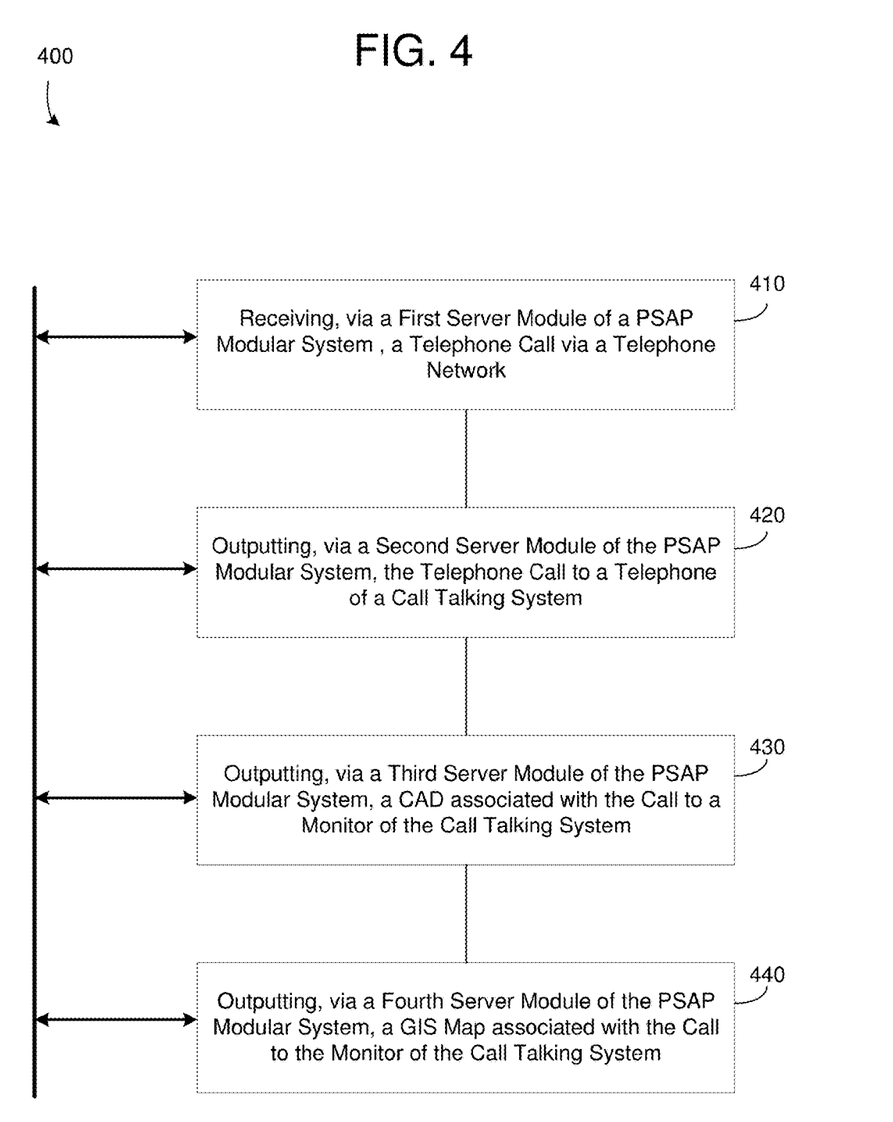
FIG. 4 is a diagram illustrating a method for communicating via a PSAP in a box in accordance with an example embodiment.

FIG. 4 illustrates a method 400 for communicating via a PSAP in a box in accordance with an example embodiment. For example, the method 400 may be performed by a computing system such as a blade server, a modular server system, a plurality of server modules, and the like. In 410, the method includes receiving, via a first server module of a public-safety answering point (PSAP) modular server system, a telephone call via a telephone network. For example, the modular server system may be a blade server system and the server modules may be blades that are housed within the blade server. In this example, the first server module may be a communication module that interconnects the modules, a telephone line, a recorder, and the like.

In 420, the method includes outputting, via a second server module of the PSAP modular server system, the telephone call to a telephone system of an operator call talking station. The second server module may be a server blade that hosts a call-talking application for the PSAP. In 430, the method includes outputting, via a third server module of the PSAP modular server system, a display of a CAD associated with the telephone call on a monitor of the operator call talking station. For example, the third server module may be a server blade that hosts a CAD application for dispatching emergency services and/or vehicles such as police, firefighters, ambulances, and the like. In 440, the method includes outputting, via a fourth server module of the PSAP modular server system, a display of a GIS based map associated with the telephone call on the monitor of the operator call talking station. The fourth server module may be a server blade that hosts a GIS service for the PSAP.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
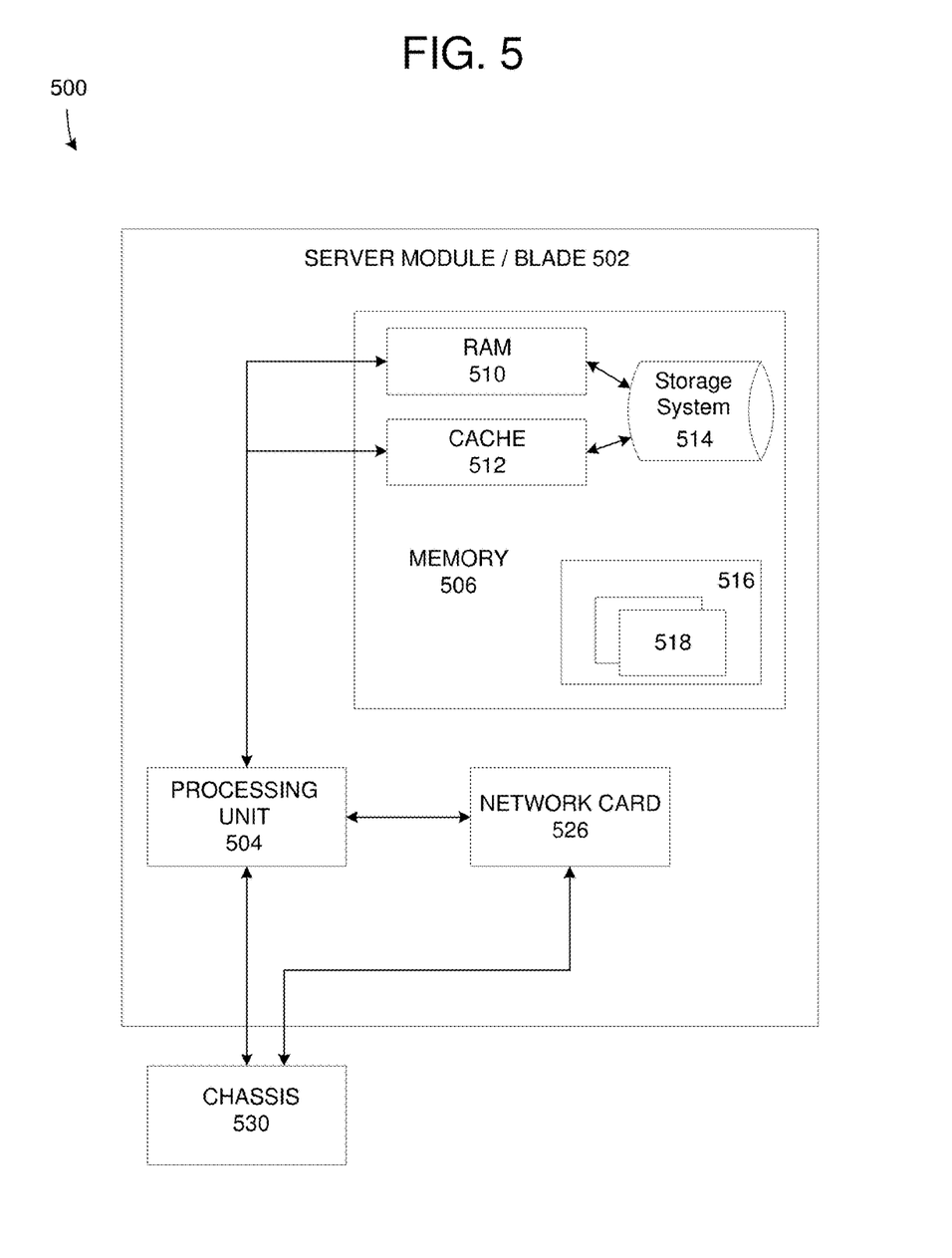
FIG. 5 is a diagram illustrating a computing system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc. The computer system 500 may be a single device or a combination of devices. For example, the computer system 500 may be a server module, a blade server, a server, and/or the like, which is housed within a chassis including multiple server modules.

FIG. 5 is not intended to suggest any limitation as to the scope of use or functionality of embodiments of the application described herein. Regardless, the computing system 500 (or node 500) is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to personal computer systems, server computer systems (e.g., modular server systems, etc.), thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in computing node 500 is shown in the form of a general-purpose computing device. The components of computer system/server 502 may include, but are not limited to, one or more processors or processing units 504 (i.e., processors), a system memory 506, and a bus that couples various system components including system memory 506 to processor 504. In the examples herein, the computing node 500 may be a blade 220 shown in FIG. 2, or another device or combination of devices such as a server, cloud platform, database, and/or the like. Also, the computing node 500 may perform the method 400 shown in FIG. 4.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with a chassis 530 of the modular server assembly which provides an interface for communicating with one or more external devices such as a keyboard, a pointing device, a display, etc.; one or more devices that enable a user to interact with computer system/server 502; and/or any devices (e.g., network card, modem, etc.) that enable computer system/server 502 to communicate with one or more other computing devices. Such communication can occur via I/O interfaces that the chassis 530 also provides connection with. Still yet, computer system/server 502 can communicate with one or more networks such as a local area network (LAN), a general wide area network (WAN), and/or a public network (e.g., the Internet) via network card 526 (also referred to as a network interface). As depicted, network card 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

According to various embodiments, the network card 526 may receive data via the chassis 530 and may communicate with other server modules that are stored within the modular server assembly and the chassis 530 via a port such as a universal serial bus (USB) connection, or the like. The processor 504 may further control the network card 526 to establish a communication channel with a call taking agent/station for performing public safety answer point communications and providing display of maps, geographical information, call talking services, video services, GIS, CAD, MAP, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A modular server system comprising:
    a chassis comprising:
        an enclosure; and
        a communication interface in the enclosure; and
        a shared network port in the enclosure, the shared network port to receive a network connection via an external cable and to distribute the network connection;
    a plurality of server modules that receive, via the communication interface, the network connection from the shared network port and that implement a public-safety answering point (PSAP), the plurality of server modules being housed by the enclosure and communicating via the communication interface, wherein the plurality of server modules include:
        a communication server module that interconnects the PSAP to a radio signal, a recorder, a telephone line, and an operator call talking system;
        a call talking server module that executes a call-taking application for outputting audio of the PSAP to the operator call talking system; and
        a computer aided dispatch (CAD) server module that outputs a computer aided dispatch for emergency vehicles and/or emergency services via a display device of the operator call talking system.

2. The modular server system of claim 1, wherein the PSAP comprises a call center for answering calls for one or more of police, firefighting, and ambulance services.

3. The modular server system of claim 1, wherein the chassis further comprises cooling fans and one or more storage devices which are each shared by the plurality of server modules that comprise the PSAP.

4. The modular server system of claim 1, wherein the chassis further comprises at least two power supplies which are each shared by the plurality of server modules for redundancy.

5. The modular server system of claim 1, wherein the modular server system comprises a diskless modular server system in which the plurality of server modules are configured to float between a plurality of blades.

6. The modular server system of claim 1, wherein the plurality of server modules further include a geographical information service (GIS) module that generates and outputs geographic mapping to the operator call talking system.

7. The modular server system of claim 1, wherein the communication interface of the chassis comprises a universal serial bus (USB) interface, and each of the plurality of server modules each comprise a corresponding USB interface which is used to connect to the communication interface of the chassis.

8. The modular server system of claim 1, wherein the modular server system comprises a blade server system, and the plurality of server modules comprise a plurality of blades that are housed within a chassis of the blade server system.

9. The modular server system of claim 1, wherein the enclosure of the chassis has a shape that is configured to be held within a single rack of a rack-mounted server cabinet.

10. A public-safety answering point (PSAP) system, comprising:
    an operator call talking system comprising a computing system and one or more of a monitor, a phone, and an input device; and
    a modular server system connected to the call talking system and comprising a chassis and a plurality of server modules that implement a PSAP and that are housed by and interconnected within the chassis,
    wherein the chassis comprises a shared network port that receives a network connection via an external cable and that distributes the network connection to the plurality of server modules via a communication interface of the chassis, and
    wherein the plurality of server modules comprise:
        a communication server module that interconnects the PSAP to a radio, a recorder, a telephone line, and the operator call talking system,
        a call talking server module that executes a call-taking application for outputting audio of the PSAP to an audio device of the operator call talking system, and
        a computer aided dispatch (CAD) server module that outputs a computer aided dispatch for emergency vehicles and/or emergency services via a display device of the operator call talking system.

11. The PSAP system of claim 10, wherein the PSAP system comprises a call center for answering calls for one or more of police, firefighting, and ambulance services.

12. The PSAP system of claim 10, wherein the chassis comprises cooling fans and one or more storage devices which are each shared by the plurality of server modules that comprise the PSAP.

13. The PSAP system of claim 10, wherein the chassis comprises at least two power supplies which are each shared by the plurality of server modules for redundancy.

14. The PSAP system of claim 10, wherein the modular server system comprises a diskless modular server system in which the plurality of server modules are configured to float between a plurality of blades.

15. The PSAP system of claim 10, wherein the plurality of server modules further include a geographical information service (GIS) module that generates and outputs geographic mapping to the operator call talking system.

16. The PSAP system of claim 10, wherein the chassis comprises a universal serial bus (USB) interface, and each of the plurality of server modules each comprise a corresponding USB interface which is used to connect to the chassis.

17. The PSAP system of claim 10, wherein the modular server system comprises a blade server system, and the plurality of server modules comprise a plurality of blades that are housed within a chassis of the blade server system.

18. A method of operating a public-safety answering point (PSAP) modular server system having server modules contained in a chassis, the method comprising:
    receiving, via a shared network port in the chassis, and via a first server module of the PSAP modular server system, a telephone call via a telephone network;

outputting, via the shared network port, and via a second server module of the PSAP modular server system, the telephone call to a telephone system of an operator call talking station;

outputting, via the shared network port, and via a third server module of the PSAP modular server system, a display of a computer aided dispatch (CAD) associated with the telephone call on a monitor of the operator call talking station; and outputting, via the shared network port, and via a fourth server module of the PSAP modular server system, a display of a geographic information service (GIS) based map associated with the telephone call on the monitor of the operator call talking station.

* * * * *

UNITED STATES PATENT AND TRADEMARK OFFICE
CERTIFICATE OF CORRECTION

PATENT NO. : 10,397,401 B1  
APPLICATION NO. : 15/926677  
DATED : August 27, 2019  
INVENTOR(S) : Brkovic et al.

Page 1 of 1

It is certified that error appears in the above-identified patent and that said Letters Patent is hereby corrected as shown below:

On the Title Page

In the illustrative figure, delete "Ethernet 126" and insert -- Ethernet input/output 126 --.

In the illustrative figure, delete "Call Taker Station 128" and insert -- call talking station 128 --.

In the Drawings

Sheet 1 of 5, in "Fig. 1", delete "Ethernet 126" and insert -- Ethernet input/output 126 --, therefor.

Sheet 1 of 5, in "Fig. 1", delete "Call Taker Station 128" and insert -- call talking station 128 --, therefor.

Sheet 5 of 5, in "Fig. 5", delete "MEMORY 506" and insert -- SYSTEM MEMORY 506 --, therefor.

Signed and Sealed this  
Twenty-ninth Day of July, 2025

Coke Morgan Stewart  
*Acting Director of the United States Patent and Trademark Office*